(12) United States Patent
Perless et al.

(10) Patent No.: US 9,938,918 B2
(45) Date of Patent: Apr. 10, 2018

(54) METHOD AND APPARATUS FOR EVALUATING ABNORMAL COMBUSTION EVENTS OF AN INTERNAL COMBUSTION ENGINE OF A MOTOR VEHICLE BY REGRESSION CALCULATION OF A PHYSICAL VARIABLE

(71) Applicant: Robert Bosch GmbH, Stuttgart (DE)

(72) Inventors: Elvira Perless, Oberriexingen (DE); Robert Sloboda, Muehlacker-Muehlhausen (DE); Matthias Biehl, Krottelbach (DE); Stefan Kempf, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 768 days.

(21) Appl. No.: 14/526,871

(22) Filed: Oct. 29, 2014

(65) Prior Publication Data

US 2015/0120167 A1 Apr. 30, 2015

(30) Foreign Application Priority Data

Oct. 29, 2013 (DE) .................. 10 2013 221 995

(51) Int. Cl.
*F02D 41/04* (2006.01)
*G01M 15/11* (2006.01)
(Continued)

(52) U.S. Cl.
CPC .......... *F02D 41/04* (2013.01); *F02D 35/023* (2013.01); *F02D 41/22* (2013.01); *F02D 41/28* (2013.01); *G01M 15/11* (2013.01); *F02D 35/027* (2013.01); *F02D 2041/143* (2013.01); *F02D 2041/1433* (2013.01); *F02D 2041/286* (2013.01); *Y02T 10/40* (2013.01)

(58) Field of Classification Search
CPC .......... F02D 41/04; F02D 41/22; F02D 41/28; F02D 35/023; F02D 35/027; F02D 2041/286; F02D 2041/143; F02D 2041/1433; G01M 15/11; Y02T 10/40
See application file for complete search history.

(56) References Cited

U.S. PATENT DOCUMENTS

| | | | |
|---|---|---|---|
| 6,614,230 B2* | 9/2003 | Raichle | F02D 35/021 324/399 |
| 2001/0045200 A1* | 11/2001 | Urushihara | F02B 1/12 123/295 |

(Continued)

*Primary Examiner* — Hieu T Vo
*Assistant Examiner* — Arnold Castro
(74) *Attorney, Agent, or Firm* — Norton Rose Fulbright US LLP; Gerard Messina (57) ABSTRACT

A method for evaluating abnormal combustion events of an internal combustion engine of a motor vehicle by regression calculation of a physical reference variable, in which method a recognition variable of the abnormal combustion event is calculated from a measured sensor signal. In a method with which abnormal combustion processes of the internal combustion engine can be reliably recognized and classified at all operating points, a stepwise system is used for regression calculation of the recognition variable, in which system at least one reference variable that corresponds to a measured reference variable of the sensor signal is calculated from the sensor signal.

15 Claims, 5 Drawing Sheets

(51) Int. Cl.
*F02D 41/22* (2006.01)
*F02D 41/28* (2006.01)
*F02D 35/02* (2006.01)
*F02D 41/14* (2006.01)

(56) References Cited

U.S. PATENT DOCUMENTS

| | | | |
|---|---|---|---|
| 2009/0132145 A1* | 5/2009 | Angeby | F02D 35/02 701/102 |
| 2010/0057327 A1* | 3/2010 | Glugla | F02D 35/028 701/103 |
| 2010/0318279 A1* | 12/2010 | Meyer | F02D 35/021 701/103 |
| 2011/0041803 A1* | 2/2011 | Qu | F02P 15/10 123/406.2 |

* cited by examiner

METHOD AND APPARATUS FOR EVALUATING ABNORMAL COMBUSTION EVENTS OF AN INTERNAL COMBUSTION ENGINE OF A MOTOR VEHICLE BY REGRESSION CALCULATION OF A PHYSICAL VARIABLE

RELATED APPLICATION INFORMATION

The present application claims priority to and the benefit of German patent application no. 10 2013 221 995.4, which was filed in Germany on Oct. 29, 2013, the disclosure of which is incorporated herein by reference.

FIELD OF THE INVENTION

The present invention relates to a method for evaluating abnormal combustion events of an internal combustion engine of a motor vehicle by regression calculation of a physical variable, in which method a recognition variable of the abnormal combustion event is calculated from a measured sensor signal; and to an apparatus for carrying out the method.

BACKGROUND INFORMATION

In gasoline engines knocking may be detected by a knock sensor. This knock sensor is disposed on the gasoline engine and conveys solid-borne sound vibrations of the gasoline engine, which occur as a result of explosion-like combustion events inside the cylinder of the gasoline engine, to an evaluation unit. These explosion-like combustion events occurring inside the combustion chamber of the gasoline engine are converted into vibrations that are conveyed to the walls of the internal combustion engine and are perceived there as solid-borne sound.

Present-day knock recognition is based on integration of the filtered and rectified solid-borne sound signals and the reference levels calculated therefrom. Integration occurs over the knock-relevant time region. This method is based substantially on methods of linear system theory and signal processing. The reference variable for knock recognition is the peak value of the bandpass-filtered cylinder pressure signal.

The same evaluation strategy is used for pre-ignition recognition. The reference variable for this combustion anomaly is the maximum value of the unfiltered cylinder pressure signal. A third example of a combustion anomaly that can be recited is misfire recognition. This event is likewise evaluated using methods from the field of system theory and signal processing, although they are utilized to evaluate a sensor information item of a crankshaft transducer.

It is disadvantageous that despite complex evaluation methods, reliable recognition of every type of abnormal combustion process under all operating conditions cannot always be guaranteed. In addition, large calculation capacities in control units of the motor vehicle extend the execution times of these evaluation methods.

SUMMARY OF THE INVENTION

An object on which the invention is based is therefore that of describing a method for evaluating abnormal combustion events of an internal combustion engine of a motor vehicle, with which method abnormal combustion processes of the internal combustion engine at all operating points can be reliably recognized and classified.

The object may be achieved according to the present invention in that a stepwise system is used for regression calculation of the recognition variable, in which system at least one reference variable that corresponds to a measured reference variable of the sensor signal is calculated from the sensor signal. Using a stepwise method of this kind it is possible to reliably recognize and classify abnormal combustion events in the form of knocking, pre-ignition, or misfiring. The system described has the advantage that it exhibits increased robustness with respect to mechanical and electrical interference, and a greater correlation between recognition variables and reference variables. Comprehensibility is enhanced by the method's recognition variable, corresponding to the reference variables, that is used as an output variable. As compared with known methods for knock recognition from the field of artificial intelligence, this method is notable for a reduced calculation outlay and for a comprehensible model, and adds to that model functions for signal processing and adaptation. The result is that, as compared with known methods, an enhanced and more robust functionality for the detection of abnormal combustion events is achieved, and an adaptation to the problem of combustion analysis is effected.

Advantageously, the stepwise system is processed in chronological succession, such that firstly a first task (step) (signal preparation) is executed in order to furnish at least one recognition feature from the measured signal; then a second task (feature adaptation) creates a typical combustion characteristic of the internal combustion engine; then a third task (linear model) is executed for regression calculation of the physical reference variable; then a fourth task (nonlinear model) is processed for regression calculation of the error of the linear model; then a fifth task is processed in order to compensate for the error of the linear model in order to limit the influence of the nonlinear model; and then a sixth task (results adaptation) is executed in order to correct the model deviation.

These tasks, to be executed successively in the sequence recited, can advantageously be processed for the various types of abnormal combustion processes, so that both knock recognition and pre-ignition, as well as misfire recognition, are possible with this sequence of method tasks as indicated.

In an embodiment, in the second task (feature adaptation) the typical combustion characteristic of the internal combustion engine is subtracted from the at least one recognition feature or divided by it. Subtraction in particular allows the baseline characteristic of the combustion process to be eliminated over all features of each combustion event, so that, all that remains upon calculation are deviations that correspond to an abnormal combustion event. With division, feature adaptation is accomplished by ascertaining a signal-to-noise ratio between normal and abnormal combustion.

In a refinement, in the third task (linear model) the calculated reference variable is identified, by regression calculation, from the recognition features that deviate from the typical combustion characteristic of the internal combustion engine. The linear model thus represents a fundamental system model that contains abnormal combustion events in a feature space. Based on this linear model, the weight of each solid-borne sound feature can be read off directly.

In a variant, the conditions for calculating the reference variable to be calculated are defined in an application process preceding measurement of the sensor signal, the recognition features of the individual tasks in particular being defined on the basis of the measured reference variable of the internal combustion engine. These recognition features are used during normal operation of the internal combustion engine in order to calculate the reference variable.

Advantageously, in order to identify the typical combustion characteristic of the internal combustion engine the measured reference variable is compared with a limit value, the measured reference variable (Peak) for normal combustion corresponding thereto when the value is below the limit value, and being received into the typical combustion characteristic of the internal combustion engine. The result of this procedure is that the recognition features that are necessary for the typical combustion characteristic of the internal combustion engine in the feature adaptation task are continuously adapted.

In an embodiment, the linear model is identified by a statistical main component analysis of the recognition features of the previously selected abnormal combustion event, which are stored in an operating-point-dependent characteristics diagram, of the calculated reference variable being calculated from the operating-point-dependent characteristics diagram over which the recognition features extend. A criterion for deciding between the typical combustion characteristic of the internal combustion engine which is stored in the feature adaptation task, and the characteristic of the abnormal combustion event represented by the linear model, is thereby acquired and furnished for calculation.

Advantageously, the nonlinear model is trained with the error of the linear model, the nonlinear model being employed for error compensation during normal operation of the internal combustion engine.

In particular, an artificial neural network is used to identify the error. The artificial neural network possesses an activation function, for example a discontinuity function or radial basis function (RBF), that is applied to the nonlinear model. Alternatively, however, a fuzzy logic system or a support vector mechanism (SVM) having a Gaussian kernel can also be used.

In an embodiment, a statistical analysis of application data and test data occurs in the results adaptation task, in order to apply a maximally correct recognition feature for identification of an abnormal combustion event. Additional quality criteria from the field of evaluation of combustion analysis (e.g. recognition quality, quantity recognition, and non-recognition) are employed here.

In a variant, a peak pressure of a cylinder is used as a recognition variable for characterizing an abnormal combustion event, this being implemented in the application process by way of a measured combustion chamber pressure in the internal combustion engine. The individual tasks are trained successively to the various abnormal combustion events using the combustion chamber pressure measured with a combustion chamber pressure sensor, so that a mathematical calculation procedure identified in the application process is defined in the various tasks, which procedure is then used, during operation of the internal combustion engine, to evaluate the recognition variable of the abnormal combustion events.

A refinement of the invention relates to an apparatus for evaluating abnormal combustion events of an internal combustion engine of a motor vehicle by regression calculation of a physical reference variable, in which apparatus a recognition variable of the abnormal combustion event is calculated from a sensor signal received by a sensor. In the context of an apparatus that requires less calculation capacity in order to identify abnormal combustion events, an arrangement is present that uses, for regression calculation of the recognition variable of the abnormal combustion event, a modular system in which at least one reference variable that corresponds to a measured reference variable of the sensor signal is calculated from the sensor signal. Because the modular system is trained as a function of the abnormal combustion events, a synergy results from the fact that parts of the modular system, for example signal processing, can be used to evaluate different types of abnormal combustion events.

The arrangement is advantageously embodied as a calculation unit that identifies the recognition variable of the abnormal combustion event in multiple tasks of a modular system, the system having:
  a first module (signal preparation) for furnishing at least one recognition feature from the measured sensor signal;
  a second module (feature adaptation) for creating a typical combustion characteristic of the internal combustion engine;
  a third module (linear model) for regression calculation of the physical reference variable;
  a fourth module (nonlinear model) for calculating the error of the linear model;
  a fifth module for compensating for the error of the linear model in order to limit the influence of the nonlinear model; and
  a sixth module (results adaptation) for correcting the systematic model deviation.

These modules can be processed successively but also separately from one another; the results of individual modules can be used in other methods for evaluating abnormal combustion events.

In an embodiment, the arrangement carries out, before reception of a sensor signal from the sensor, an application process in which recognition features of the individual modules are defined on the basis of a measured reference variable of the internal combustion engine. This ensures that the recognition features used during operation of the internal combustion engine in order to identify the abnormal combustion event do in fact characterize the corresponding abnormal combustion events.

The invention admits of numerous embodiments. One of them will be explained in further detail with reference to the Figures depicted in the drawings. Identical features are labeled with identical reference characters.

DETAILED DESCRIPTION

Figure 1:
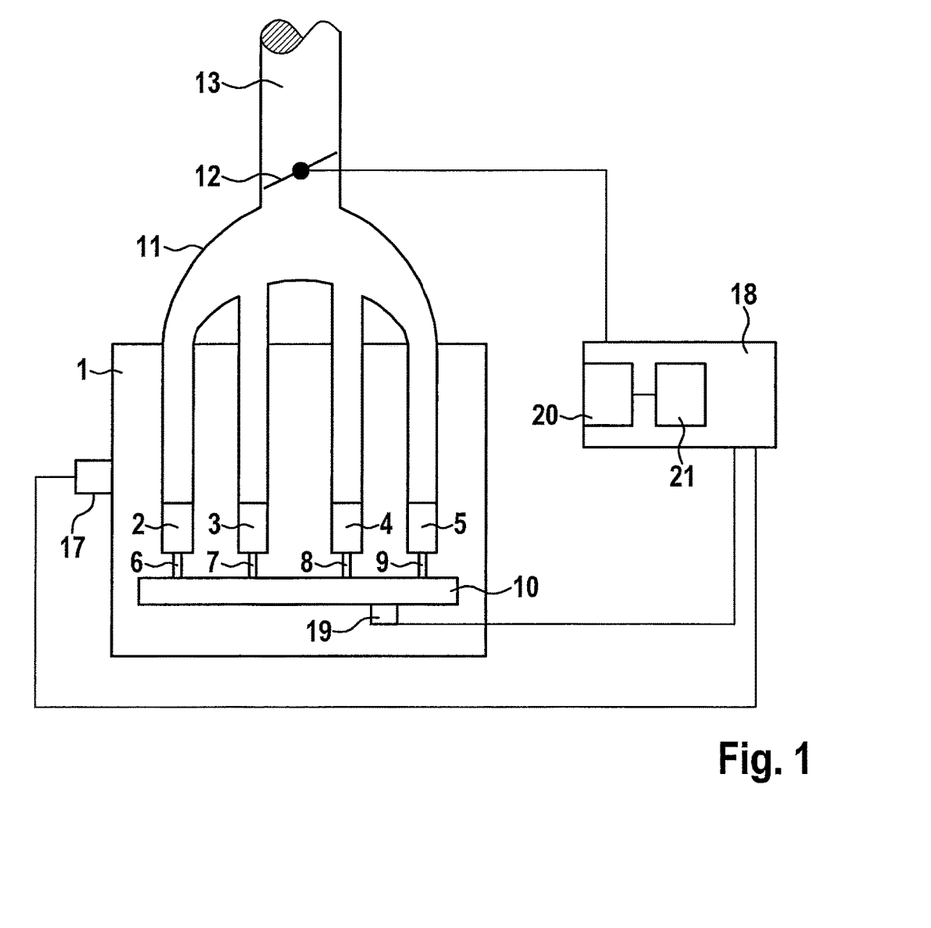
FIG. 1 shows an apparatus for sensing knock signals in an internal combustion engine.
Figure 2:
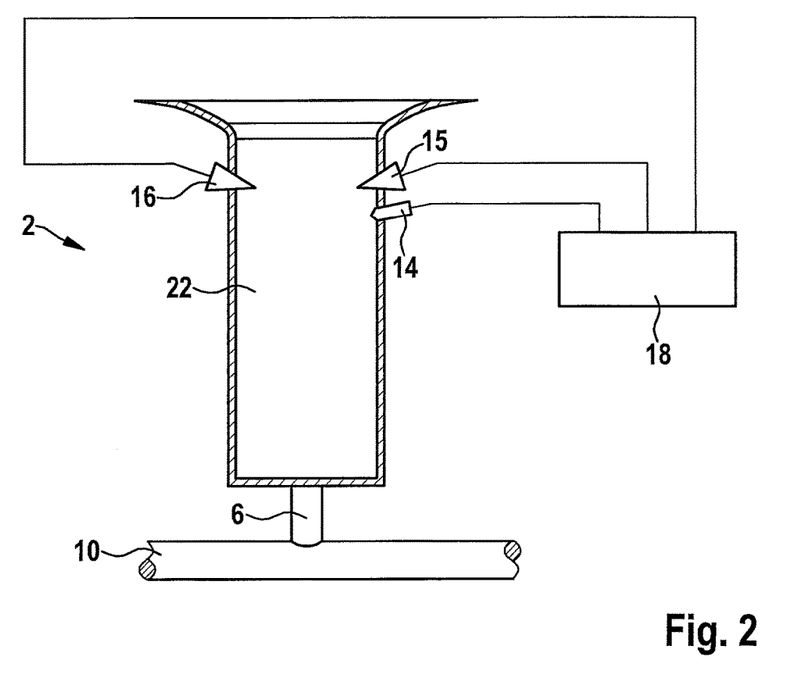
FIG. 2 shows an exemplifying embodiment of a cylinder of the internal combustion engine according to FIG. 1.

FIG. 1 shows an apparatus for sensing knock signals in an internal combustion engine that may be embodied as a gasoline engine. In this example, internal combustion engine 1 has four cylinders 2, 3, 4, 5 whose pistons (not depicted further), which move in cylinders 2, 3, 4, 5, are each connected via a connecting rod 6, 7, 8, 9 to crankshaft 10 and drive it as a result of the changes in pressure caused by combustion. Cylinders 2, 3, 4, 5 are connected to an intake manifold 11 that is closed off by a throttle valve 12 with respect to an air intake duct 13. Projecting into each cylinder 2, 3, 4, 5 is a nozzle 14 for the injection of fuel and an intake valve 15 for fresh air, the result being that a fuel-air mixture forms in cylinders 2, 3, 4, 5. In addition, each cylinder 2, 3, 4, 5 has an exhaust valve 16 for the exhaust gases that are produced during the combustion processes, as depicted in FIG. 2 by way of example only for cylinder 2.

Disposed on internal combustion engine 1 is a solid-borne sound sensor 17 that detects the solid-borne sound vibrations caused by the combustion events and transferred to internal combustion engine 1. The signals of solid-borne sound sensor 17 are conveyed to a control unit 18 that is also connected to a crankshaft sensor 19 located opposite the crankshaft; control unit 18 associates the combustion events with the signal of crankshaft sensor 19 which represents a crankshaft angle. Control unit 18 has a microprocessor 20 that is connected to a memory 21.

In internal combustion engine 1, combustion of the delivered fuel-air mixture causes a vehicle equipped with internal combustion engine 1 to be shifted into driving operation, or causes driving operation to be maintained. Combustion of the fuel-air mixture is initiated by an ignition spark of a spark plug. The ignition spark establishes a flame front that propagates in the entire combustion chamber 22 of the respective cylinder 2, 3, 4, 5 of the internal combustion engine and, during combustion, converts the fuel-air mixture that is present into kinetic energy. In the case of a knocking combustion event, a portion of the combustion event occurs abruptly and causes in combustion chamber 22 of cylinders 2, 3, 4, 5 of internal combustion engine 1 a sharp rise in pressure, which generates a pressure wave that propagates and strikes the walls delimiting combustion chamber 22 of cylinders 2, 3, 4, 5, where the high-frequency vibrations are converted into solid-borne sound. These mechanical vibrations are sensed by solid-borne sound sensor 17. Control unit 18 evaluates these continuous electrical vibrations, this being taken into account in the context of the control of internal combustion engine 1 by control unit 18 during knock regulation, in order to avoid engine damage.

Figure 3:
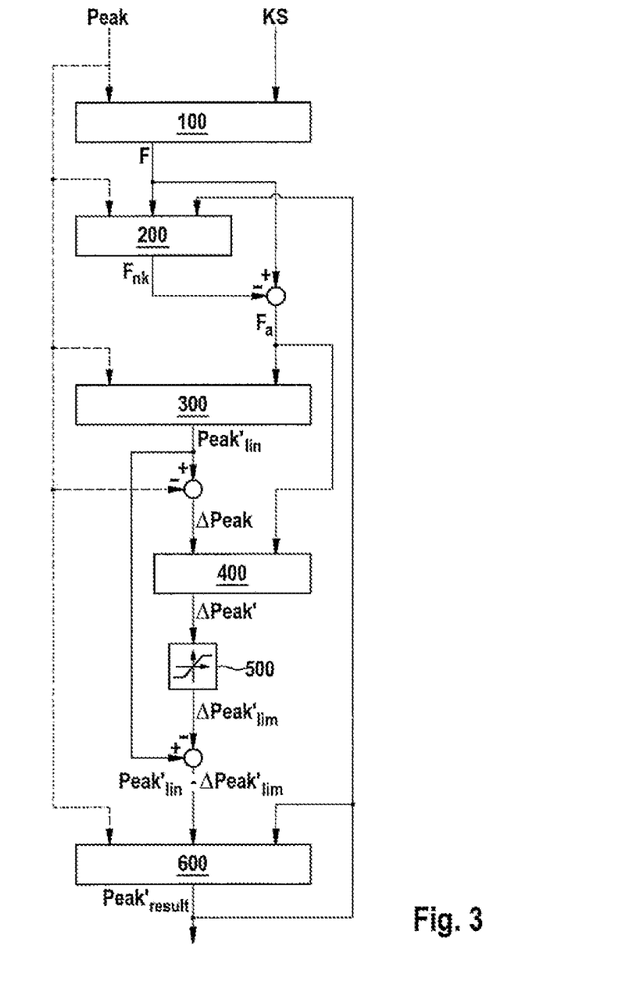
FIG. 3 shows an exemplifying embodiment of a model structure of the method according to the present invention.

FIG. 3 shows an example of a stepwise system for regression calculation of parameters for evaluating abnormal combustion processes based on knock recognition; each task of the system can be regarded as a self-contained module. The system is made up of several tasks: signal preparation 100, feature adaptation 200, linear model 300, nonlinear model 400, fault limiter 500 of the nonlinear model, and results adaptation 600. Before utilization of the system during the operation of internal combustion engine 1, firstly an application process is carried out. In this application process a combustion chamber pressure is measured by way of combustion chamber pressure sensor 17, and a peak pressure Peak of the bandpass-filtered combustion chamber pressure signal of a cylinder 2, 3, 4, 5 is derived therefrom, this representing the input signal for tasks 100, 200, 300, 400, and 600 of the system. This peak pressure Peak thus represents the characteristic measured reference variable for the detection of abnormal combustion processes from the solid-borne sound detected by knock sensor 17 of internal combustion engine 1.

In the first task (signal preparation 100), during the application process the recognition features F, which are needed for subsequent calculation of all the calculated reference variables (referred to as "intermediate variables") $Peak'_{lin}$, $\Delta Peak'$, $\Delta Peak'_{lim}$ of the abnormal combustion event in a cylinder 2, 3, 4, 5, are defined. This can be, for example, a frequency spectrum of the combustion event or a time region of the combustion event.

In the second task (feature analysis 200), a typical combustion characteristic of the internal combustion engine is then defined, for example in the form of the above-described time and frequency spectrum which corresponds to a normal combustion event. This is accomplished by comparing the measured peak pressure with a threshold value and associating only those combustion events which fall below the threshold value with the typical combustion characteristic of the internal combustion engine.

In the third task (linear model 300), for regression calculation of the calculated reference variable $Peak'_{lin}$ outputted as an intermediate variable, an N-dimensional operating-point-dependent characteristics diagram is created from the recognition features characterizing the measured peak pressure Peak, which are associated with said measured peak pressure Peak.

In the fourth task (nonlinear model 400), an error $\Delta Peak'$ of the linear model 300 is identified for the reference variable $Peak'_{lin}$ calculated from a main component analysis as an intermediate variable. In the fifth task, this error $\Delta Peak'$ is limited in a limiter 500 in order to suppress influence on the error $\Delta Peak'$ by unforeseen events. Error limiter 500 thus outputs a limited error $\Delta Peak'_{lim}$.

In the sixth task (results adaptation), model deviations are optimized, for example, by offset correction and slope correction.

The process of training tasks 100 to 600 in the application process occurs in the sequence described, beginning with signal processing 100 through to results adaptation 600. The use of a time-frequency analysis allows identification of those frequency regions which possess an elevated information content upon occurrence of an abnormal combustion event. For each identified frequency region, a time region is defined on the basis of threshold values in order to minimize the risk of interference influencing the usable signal. The use of a time-frequency analysis during practical operation is not necessary, and can be replaced e.g. by filtration of the signal in the identified frequency region or calculation of a frequency transformation in the defined time region.

The task of feature analysis 200 is initiated with the typical combustion characteristic of the internal combustion engine, and updates this combustion characteristic during practical operation based on the calculated recognition features F, $F_{nk}$ and the recognition variable $Peak'_{result}$. The linear model 300 is then identified, this being done using a main component analysis. This method from the field of statistics offers the advantages of high reproducibility for linear model 300, and low calculation outlay. The subsequently trained nonlinear model 400 is constituted by an artificial neural network having a radial basis function (RBF) as activation function. Results adaptation 600 is performed on the basis of a statistical analysis, for example a correlation between application data and test data or their regression curves.

During calculation, various intermediate variables $Peak'_{lin}$, $\Delta Peak'$, and $\Delta Peak_{lim}$ are identified within the modular model, and from these the final recognition variable $Peak'_{result}$ is calculated. These intermediate variables encompass the estimated peak pressure $Peak'_{lin}$, the error $\Delta Peak'$, and the limited error $\Delta\text{Peak'}_{lim}$, which are also referred to hereinafter as "calculated" reference variables.

Once the individual tasks 100 to 600 have been correspondingly prepared in the adaptation process, this method is implemented in control unit 18, in particular in memory 22 thereof. During operation of the internal combustion engine, the knock signals KS supplied by knock sensor 17 are delivered to microprocessor 20, which first invokes signal preparation 100. This signal preparation task 100 furnishes the recognition features F that are required for identification or calculation of the further models 300, 400.

Methods from the sector of conventional signal processing, for example filtering, integration and maximum value determination, and transformation (e.g. Fourier transformation, wavelet transformation) are used in this signal preparation task 100. The output signals from signal preparation 100 are recognition features F that were defined during the application process. These recognition features F are associated with feature adaptation task 200. Because the signal-to-noise ratio between the baseline noise of the knock signal KS and the abnormal combustion event has already been identified in the application process, the non-knocking recognition features $F_{nk}$ that represent the result of feature adaptation task 200 are subtracted from the general solid-borne sound features F that were calculated in signal preparation 100. The recognition features F are thus adapted by calculating the difference between the combustion noise and the baseline characteristic of the combustion event. The result represents the adapted recognition features $F_a$, which are delivered to linear model 300. Linear model 300 contains the characteristics diagram, created in the application process, of adapted recognition features $F_a$, which characterizes the abnormal combustion events. The adapted recognition features $F_a$ are characterized in the operating-point-dependent characteristics diagram, and as a function thereof an estimated peak pressure is calculated as a calculated reference variable $\text{Peak'}_{lin}$.

At the same time, the adapted recognition features $F_a$ are delivered to nonlinear model 400, which calculates an error $\Delta\text{Peak'}$ based on the inputs. The reference variables $\text{Peak'}_{lin}$ (estimated peak pressures) calculated from linear model 300 are subtracted from the measured reference variable Peak (measured peak pressure), yielding a deviation $\Delta\text{Peak}$ that is delivered to nonlinear model 400. From the adapted recognition features $F_a$ and the deviation $\Delta\text{Peak}$, nonlinear model 400 identifies the error $\Delta\text{Peak'}$ which is delivered as input variable to an error limiter 500. Error limiter 500 outputs a limited error $\Delta\text{Peak'}_{lim}$. Because nonlinear model 400, which maps and compensates for the errors $\Delta\text{Peak'}$ of linear model 300, can react to unknown data with implausible outputs (which can result in erroneous behavior in combustion analysis when used in production vehicles), the influence of nonlinear model 400 on the result of linear model 300 is limited.

This limited error $\Delta\text{Peak'}_{lim}$ is deducted from the reference variable $\text{Peak'}_{lin}$ (calculated peak pressure) calculated in linear model 300. This difference constitutes an input variable for results adaptation task 600, which outputs the calculated recognition variable $\text{Peak'}_{result}$ of the abnormal combustion event.

Figure 4:
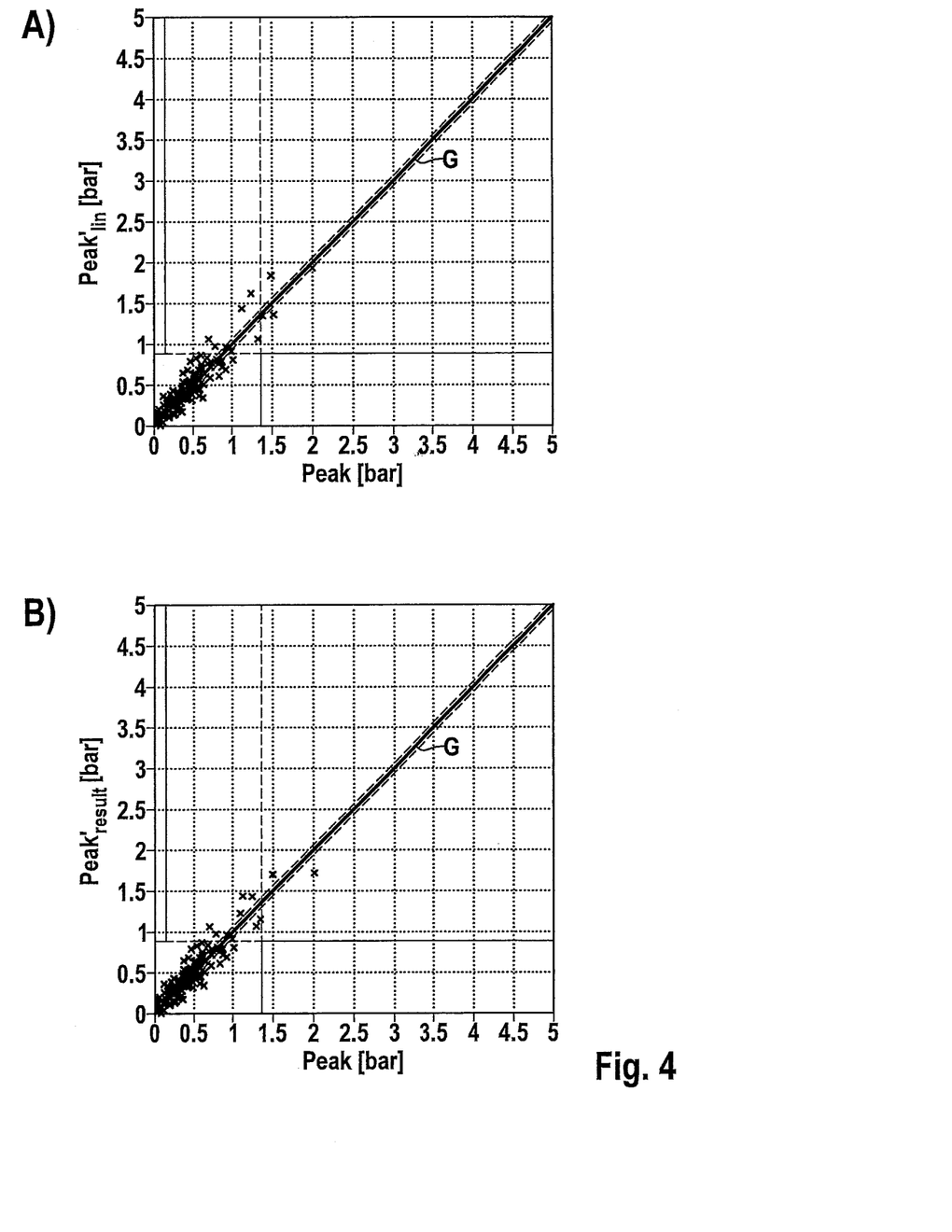
FIG. 4 is a first regression diagram having a measured recognition value and a calculated recognition variable, at a first rotation speed.
Figure 5:
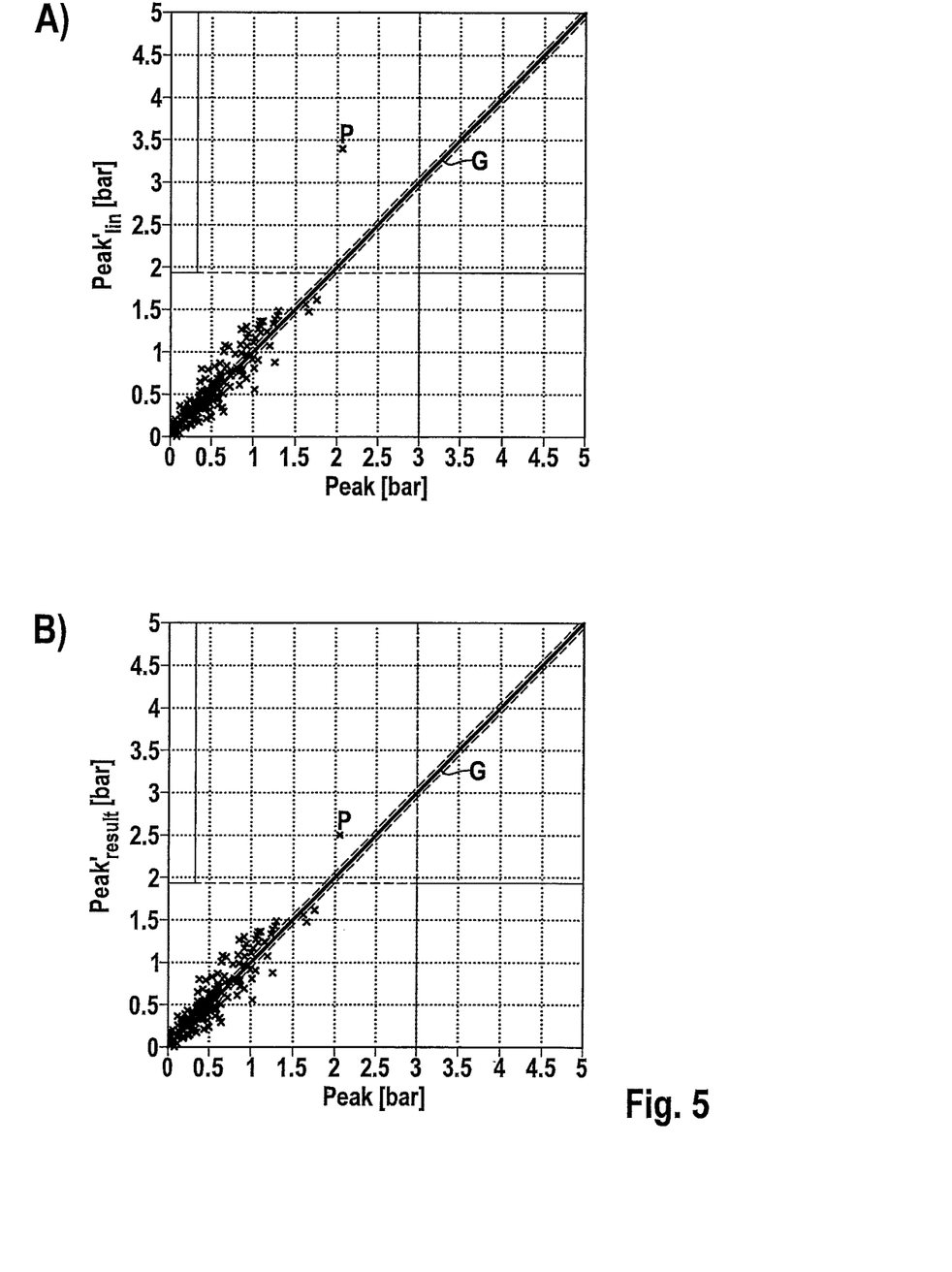
FIG. 5 is a second regression diagram having a measured recognition value and a calculated recognition variable, at a second rotation speed.

FIGS. 4 and 5 depict the output of linear model 300 and the output after error correction by nonlinear model 400, at two different rotation speeds of internal combustion engine 1. FIG. 4 shows linear model 300 (FIG. 4A) and the correction by nonlinear model 400 (FIG. 4B) at a rotation speed of 1400 rpm, while FIG. 5A depicts linear model 300 and FIG. 5B shows the output after correction by nonlinear model 400 at a rotation speed of 3000 rpm with internal combustion engine 1 under full load. In these regression diagrams, the measured result value is plotted on the abscissa and the calculated result value on the ordinate, for detection of knocking combustion events. A comparison of the respective linear model 300 with the associated correcting nonlinear model 400 shows that after correction, the individual calculated peak pressure values Peak' correspond more closely to the regression curve G constituted from the data currently being considered. This is very evident, for example, from point P in FIG. 5, where the result of the correction is that point P is brought substantially closer to the curve G identified by linear model 300.

What is claimed is:

1. A method for evaluating an abnormal combustion event of an internal combustion engine of a motor vehicle by regression calculation of a physical reference variable, the method comprising:
   determining, via a determining arrangement, a recognition variable of the abnormal combustion event from a measured sensor signal;
   calculating, via a modular system, which is for regression calculation of the recognition variable of the abnormal combustion event, from the sensor signal at least one reference variable from the sensor signal, the at least one reference variable corresponding to a measured reference variable of the sensor signal;
   wherein the stepwise system is processed or performed in chronological succession, as follows:
      a first task of signal preparation is executed to furnish at least one recognition feature from the measured signal;
      a second task of feature adaptation creates a typical combustion characteristic of the internal combustion engine;
      a third task of a model is executed for regression calculation of the physical reference variable;
      a fourth task of another model is processed for regression calculation of the error of the model;
      a fifth task is processed to compensate for the error of the model to limit the influence of the another model; and
      a sixth task of adaptation is executed to correct the model deviation.

2. The method of claim 1, wherein the model is a liner model, and wherein the another model is a nonlinear model.

3. The method of claim 1, wherein in the second task of feature adaptation of the typical combustion characteristic of the internal combustion engine is subtracted from the at least one recognition feature of a combustion event to be evaluated, or is divided thereby.

4. The method of claim 1, wherein in the third task of the model, the calculated reference variable is identified, by regression calculation, from the recognition features that deviate from the typical combustion characteristic of the internal combustion engine.

5. The method of claim 1, wherein the conditions for calculating the reference variable to be calculated are defined in an application process preceding measurement of the sensor signal, the recognition features of the individual tasks in particular being defined based on the measured reference variable of the internal combustion engine.

6. The method of claim 5, wherein to identify the typical combustion characteristic of the internal combustion engine the measured reference variable is compared with a limit value, the measured reference variable for normal combustion corresponding thereto when the value is below the limit value, and being received into the typical combustion characteristic of the internal combustion engine.

7. The method of claim 6, wherein the model is identified by a statistical main component analysis of the recognition features of the abnormal combustion event which are stored in a characteristics diagram, the calculated reference variable being calculated from the operating-point-dependent characteristics diagram over which the recognition features extend.

8. The method of claim 5, wherein the error of the model is defined for the reference variable calculated from the main component analysis.

9. The method of claim 8, wherein an artificial neural network is used to identify the error.

10. The method of claim 9, wherein a limitation of the output of the another model is limited by a limiter.

11. The method of claim 1, wherein a statistical analysis of a set of data occurs in the results adaptation task, wherein the set of data includes application data and test data.

12. The method of claim 1, wherein a peak pressure of a cylinder is used as a recognition variable, this being implemented in an application process by a measured combustion chamber pressure in at least one cylinder of the internal combustion engine.

13. An apparatus for evaluating an abnormal combustion event of an internal combustion engine of a motor vehicle by regression calculation of a physical reference variable, comprising:
   a determining arrangement to determine a recognition variable of the abnormal combustion event from a sensor signal received by a sensor, the determining arrangement including an arrangement that uses, for regression calculation of the recognition variable of the abnormal combustion event, a modular system in which at least one reference variable that corresponds to a measured reference variable of the sensor signal is calculated from the sensor signal;
   wherein the arrangement is a calculation unit that identifies the recognition variable of the abnormal combustion event in multiple tasks of a modular system, the system including:
      a first module for providing signal preparation for furnishing at least one recognition feature from the measured sensor signal;
      a second module for providing feature adaptation for creating a typical combustion characteristic of the internal combustion engine;
      a third module for providing a model for regression calculation of the physical reference variable;
      a fourth module for providing another model for calculating the error of the linear model;
      a fifth module for providing compensating for the error of the model to limit the influence of the another model; and
      a sixth module for providing adaptation for correcting the systematic model deviation.

14. The apparatus of claim 13, wherein the model is a liner model, and wherein the another model is a nonlinear model.

15. The apparatus of claim 13, wherein the arrangement performs, before reception of the sensor signal from the sensor, an application process in which recognition features of the individual modules are defined based on a measured reference variable of the internal combustion engine.

* * * * *